US008259005B1

(12) United States Patent
Lam et al.

(10) Patent No.: US 8,259,005 B1
(45) Date of Patent: Sep. 4, 2012

(54) TRUE TIME DELAY DIVERSITY BEAMFORMING

(75) Inventors: Lawrence K. Lam, San Jose, CA (US); Albert Ngo, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 336 days.

(21) Appl. No.: 12/722,670

(22) Filed: Mar. 12, 2010

Related U.S. Application Data

(60) Provisional application No. 61/162,994, filed on Mar. 24, 2009, provisional application No. 61/161,382, filed on Mar. 18, 2009, provisional application No. 61/162,226, filed on Mar. 20, 2009.

(51) Int. Cl.
*G01S 7/40* (2006.01)

(52) U.S. Cl. ............ 342/174; 342/81; 342/83; 342/157; 342/371; 342/375

(58) Field of Classification Search .................. 342/174, 342/81, 83–88, 157–158, 368, 371–375
See application file for complete search history.

(56) References Cited

U.S. PATENT DOCUMENTS 4,544,927 A * 10/1985 Kurth et al. .................. 342/373
5,351,053 A * 9/1994 Wicks et al. .................. 342/158
5,493,304 A * 2/1996 Lee et al. ...................... 342/360
H1773 H * 1/1999 Cheston et al. ............... 342/375
5,874,915 A * 2/1999 Lee et al. ...................... 342/375
6,016,304 A 1/2000 Kyle et al.
6,307,506 B1 * 10/2001 Despain ........................ 342/368
6,529,162 B2 * 3/2003 Newberg et al. .............. 342/375
6,701,141 B2 * 3/2004 Lam ............................. 455/273
6,747,595 B2 * 6/2004 Hirabe .......................... 342/174
6,894,654 B2 5/2005 Lynch
7,009,560 B1 * 3/2006 Lam et al. ..................... 342/375
7,271,767 B2 9/2007 Londre (Continued)

FOREIGN PATENT DOCUMENTS

WO WO 2007106159 A2 * 9/2007

OTHER PUBLICATIONS

Ellingson, S.W.; , "Beamforming and interference canceling with very large wideband arrays," Antennas and Propagation, IEEE Transactions on , vol. 51, No. 6, pp. 1338-1346, Jun. 2003.*

(Continued)

*Primary Examiner* — John B Sotomayor
(74) *Attorney, Agent, or Firm* — Fraser Clemens Martin & Miller LLC; J. Douglas Miller

(57) ABSTRACT

A true time delay beamforming system and calibration method for transmission and reception of a beam is disclosed. The true time delay beamforming system comprises at least one input signal received by at least one signal conditioning device, wherein the signal conditioning device is adapted to provide selective, independent, and variable control of one of a phase delay, a time delay and an amplitude of the input signal to produce an output signal. A control logic device is adapted to provide a control logic signal to the at least one signal conditioning device for selectively activating and controlling the signal conditioning device. The true time delay beamforming system may further include an automatic calibration system that generates an error correction signal based on errors detected in the output signal, and selectively adjusts the control logic signal based thereon.

17 Claims, 5 Drawing Sheets

U.S. PATENT DOCUMENTS

| | | | | |
|---|---|---|---|---|
| 7,394,424 | B1 * | 7/2008 | Jelinek et al. | 342/375 |
| 7,511,666 | B2 * | 3/2009 | Jacomb-Hood et al. | 342/374 |
| 7,813,766 | B1 * | 10/2010 | Lam | 455/562.1 |
| 2002/0013133 | A1 * | 1/2002 | Lam | 455/137 |
| 2004/0080705 | A1 | 4/2004 | Koh et al. | |
| 2005/0088358 | A1 * | 4/2005 | Larry et al. | 343/833 |
| 2005/0195103 | A1 * | 9/2005 | Davis et al. | 342/99 |
| 2011/0122026 | A1 * | 5/2011 | DeLaquil et al. | 342/372 |

OTHER PUBLICATIONS

Ashok K. Agrawal, Eric L. Holzman, "Beamformer Architectures for Active Phased-Array Radar Antennas", IEEE Transactions on Antennas and Propagation, Mar. 1999, vol. 47, No. 3.

* cited by examiner

TRUE TIME DELAY DIVERSITY BEAMFORMING

CROSS-REFERENCE TO RELATED APPLICATIONS

The present application claims priority to the following: U.S. Provisional Application Ser. No. 61/161,382 filed Mar. 18, 2009; U.S. Provisional Application Ser. No. 61/162,226 filed Mar. 20, 2009; and U.S. Provisional Application Ser. No. 61/162,994 filed Mar. 24, 2009. Each of the foregoing Applications is incorporated by reference herein in its entirety.

STATEMENT REGARDING FEDERALLY SPONSORED RESEARCH OR DEVELOPMENT

Not applicable.

FIELD OF THE INVENTION

The invention relates to beamforming. In particular, the invention is directed to a method and apparatus for adaptive variable true time delay beamforming to implement electronically scanned phased array signals.

BACKGROUND OF THE INVENTION

In antenna systems that comprise a plurality of antennas, the signals received from the plurality of antennas must be combined to form a coherent beam. Alternatively, a coherent beam must be divided into separate signals for transmission from a plurality of antennas. In antenna arrays where the antenna elements are spatially close together, only phase delays are required to accomplish beamforming. When the antenna elements are not spatially close together, time delays are also required to accomplish beamforming.

In some installations, a plurality of antenna elements is utilized wherein individual antenna elements are "diverse", that is, are different in location, orientation, size and other aspects. Such an installation requires precise control over time delay, phase delay and amplitude to achieve coherent beamforming. Phase continuous true time delay circuits are known that accomplish the coherent beamforming from diverse antenna arrays to provide higher communication data rates, reduced power requirements and wider coverage areas.

Commonly owned U.S. Pat. No. 7,009,560, incorporated by reference herein in its entirety, discloses an adaptive variable true time delay beamforming system. In one disclosed embodiment, the beamforming system is utilized to characterize a received signal and to calibrate an antenna system that includes a variable true time delay system. However, known true time delay systems utilize RF cables or optical fibers having different lengths to impart a time delay, making physical manipulation of these cables or optical fibers required for any calibration. Moreover, known systems require periodic maintenance after system deployment, and further require periodic testing, calibration and performance verification, especially if the RF cables or optical fibers are interchanged in the field.

It is desirable to develop a method and system to automatically calibrate a variable true time delay beamforming system applicable to both transmission and reception of RF signals that greatly reduces or eliminates the need for periodic tests, calibration and performance verifications in the field.

SUMMARY OF THE INVENTION

Concordant and consistent with the present invention, a true time delay beamforming system and calibration method has been discovered. The true time delay beamforming system comprises at least one input signal received by at least one signal conditioning device, wherein the signal conditioning device is adapted to provide selective, independent, and variable control of one of a phase delay, a time delay and an amplitude of the input signal to produce an output signal. A control logic device is adapted to provide a control logic signal to the at least one signal conditioning device for selectively activating and controlling the signal conditioning device. In one embodiment, the input signal is received from at least one antenna. In another embodiment, the output signal is received by an antenna for transmission thereof.

The true time delay beamforming system may further include a calibration system for detecting and correcting error in one of a time delay, a phase and an amplitude of the output signal. The calibration system may comprise a channel signal and noise characterization unit adapted to receive the output signal and to detect phase, amplitude and time errors and to generate an estimated error correction signal therefrom, the error correction signal received by the control logic device for selectively generating the control logic signal. In another embodiment, the input signal is generated as a portion of the control logic signal for calibration of the beamforming system.

A method for calibrating a true time delay beamforming system is also disclosed.

The true time delay beamforming system and method of the present invention results in a system having a reduced footprint and power requirements. The system does not include any moving parts, and does not include any parts that require physical manipulation in the field for maintenance or for calibration. A calibration method for the beamforming system may further accomplish periodic or commanded system verification, calibration and correction electronically without requiring any physical manipulation of the beamforming system.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
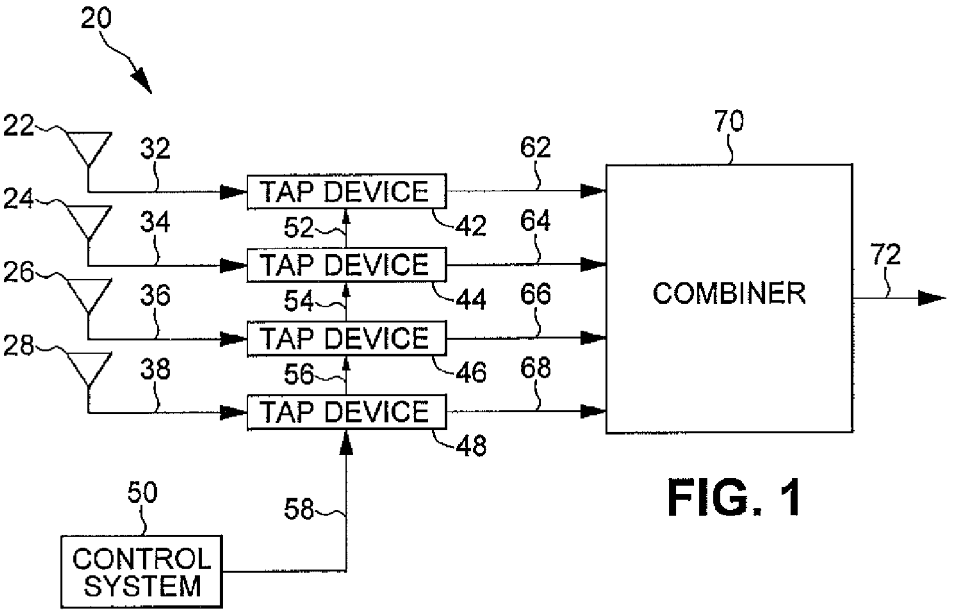
FIG. 1 is a simplified block diagram for an adaptive variable time time delay beamforming method adapted to receive a signal and generate a single output according to one embodiment of the invention.

FIG. 1 illustrates a beamforming system 20 wherein an array of antennas 22, 24, 26, 28 collects respective signals 32, 34, 36, 38. It is understood that the antennas 22, 24, 26, 28 may be diverse, and may comprise any number of antenna elements or sub-elements. In order to assemble a coherent signal from the antennas 22, 24, 26, 28, the signals 32, 34, 36, 38 must be combined to form an electronically scanned beam. In situations where the antennas 22, 24, 26, 28 are spatially close together, only a phase delay of each signal 32, 34, 36, 38 must be modified for beamforming. However, when the antennas 22, 24, 26, 28 are spatially far apart, a phase delay and a time delay of each signal 32, 34, 36, 38 must be modified. In some situations, an amplitude of each signal 32, 34, 36, 38 must also be modified.

To accomplish control and modification of one of a phase delay, a time delay and an amplitude, each of the signals 32, 34, 36, 38 is received by a respective signal conditioning device 42, 44, 46, 48. The signal conditioning devices 42, 44, 46, 48, also known as time amplitude phase control ("TAP") devices, are fully described in commonly owned U.S. patent application Ser. No. 12/722,625 entitled "Variable Time, Phase, And Amplitude Control Device", filed on Mar. 12, 2010, incorporated herein by reference in its entirety.

Each of the TAP devices 42, 44, 46, 48 provides selective, independent, and variable control over a time delay, an amplitude, and a phase of a radio frequency signal, and is implemented as a packaged radio frequency integrated circuit (RFIC). Additionally, to accomplish selective, independent and variable control over a time delay, an amplitude and a phase of a radio frequency signal, each of the TAP devices 42, 44, 46, 48 is adapted to receive a respective control logic signal 52, 54, 56, 58 from a control system 50. The control logic signals 52, 54, 56, 58 provide each respective TAP device 42, 44, 46, 48 with logic for independently and selectively activating and adjusting the various components of the TAP devices 42, 44, 46, 48. The control logic signals 52, 54, 56, 58 may also be used for any of a variety of other suitable functions for the respective TAP devices 42, 44, 46, 48. It is understood that the control logic signals 52, 54, 56, 58 may be implemented by and include any number of hardware and software components to route and process signals and control the functionality of the TAP devices 42, 44, 46, 48, including by the control system 50 or by components and software internal to each of the TAP devices 42, 44, 46, 48.

The TAP devices 42, 44, 46, 48 provide an independently controllable and programmable time delay, an amplitude and a phase control over the respective signals 32, 34, 36, 38 and generate respective output signals 62, 64, 66, 68, each of which is received and combined by a signal combiner 70 into a coherent output signal 72.

Prior designs of beamforming systems have required multiple electronic components occupying a relatively large amount of physical space and requiring a relatively large amount of power. However, the beamforming system 20 utilizes RFIC components to minimize an overall package size and provide lower power consumption, lower cost, and simplicity of use. The TAP devices 42, 44, 46, 68 may be combined with the control system 50 and the signal combiner 70 onto a single multi-layer printed circuit board, reducing the size of the unit from a conventional 1U 19 inch rack size to the size of matchbox of a surface mount integrated circuit package, on the order of three square inches or less.

Moreover, each multi-layer printed circuit board may be easily and repeatedly reproduced. The multi-layer printed circuit beamforming system 20 does not include any moving parts, and does not include any parts that require physical manipulation in the field for maintenance or for calibration. As a result, the beamforming system 20 may not require periodic maintenance in the field, and the beamforming system 20 may not require calibration beyond an initial factory calibration. However, the beamforming system 20 may further include a calibration system that accomplishes system verification, calibration and correction electronically without requiring any physical manipulation of the beamforming system 20.

Figure 2:
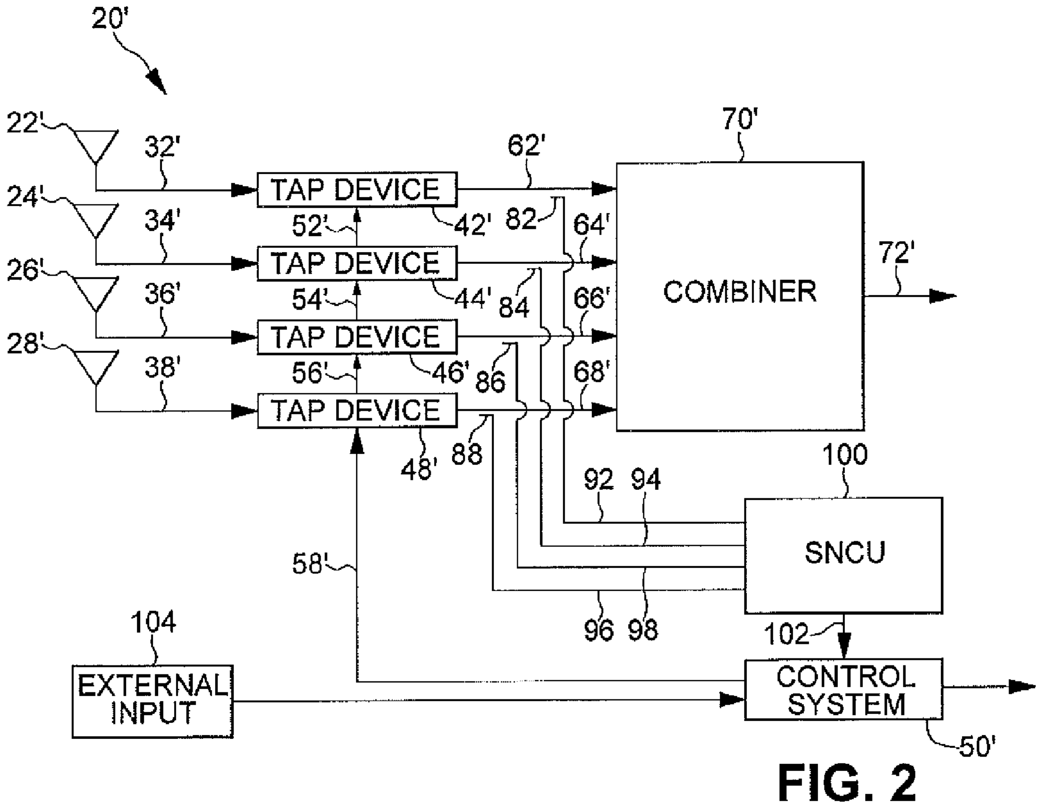
FIG. 2 is a simplified block diagram for an adaptive variable true time delay beamforming method adapted to receive a signal and generate a single output, further including automatic calibration according to another embodiment of the invention.

Another embodiment of a beamforming system 20' for receiving signals 32', 34', 36', 38' is illustrated in FIG. 2. Structure repeated from the description of FIG. 1 includes the same reference numeral and a prime (') symbol. Additionally, the beamforming system 20' includes a system to provide automatic calibration and correction information to the TAP devices 42', 44', 46', 48', where each of the TAP devices 42', 44', 46', 48' respectively provides a single output signal 62', 64', 66', 68'. The automatic calibration system utilizes RF couplers 82, 84, 86, 88 to respectively sample the output signals 62', 64', 66', 68' generated by the respective TAP devices 42', 44', 46', 48'. The sampled signals 92, 94, 96, 98 are received by a channel signal and noise characterization unit 100 that measures and characterizes the sampled signals 92, 94, 96, 98. Any discrepancy, including phase, amplitude or time error, is detected by the channel signal and noise characterization unit 100, and an estimated error correction signal 102 is supplied to a control system 50'. Depending upon the required error correction, the control system 50' may generate or modify one or more of the control logic signals 52', 54', 56', 58' for selectively activating and adjusting the various components of the respective TAP devices 42', 44', 46', 48'. The estimated error correction signal 102 may further be modified by external input and commands 104, which may be provided electronically or manually as desired. The control system 50' may command adjustment to none, one or more of the TAP devices 42', 44', 46', 48', as needed and desired.

Figure 3:
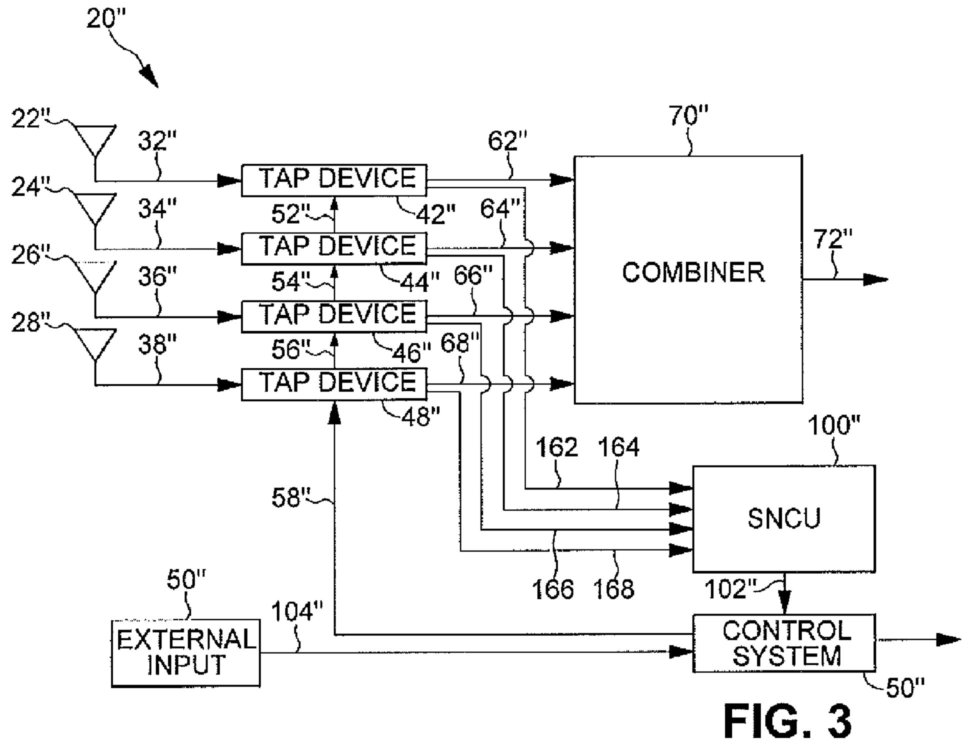
FIG. 3 is a simplified block diagram for an adaptive variable true time delay beamforming method adapted to receive a signal and generate a dual output wherein one output is utilized for automatic calibration according to another embodiment of the invention.

A further embodiment of a beamforming system 20" for receiving signals 32", 34", 36", 38" is illustrated in FIG. 3. Structure repeated from the description of FIG. 1 or FIG. 2 includes the same reference numeral and a double prime (") symbol. The beamforming system 20" includes a system to provide automatic calibration and correction information to the TAP devices 42", 44", 46", 48", where each of the TAP devices 42", 44", 46", 48" respectively provides at least a second output signal 162, 164, 166, 168. The second output signals 162, 164, 166, 168 may be control signals representative of the output signals 62", 64", 66", 68". More typically, the second output signals 162, 164, 166, 168 are identical to the output signals 62", 64", 66", 68". The second output signals 162, 164, 166, 168 are directly received by a channel signal and noise characterization unit 100" that measures and characterizes the second output signals 162, 164, 166, 168, Any discrepancy, including phase, amplitude or time error, is detected by the channel signal and noise characterization unit 100", and an estimated error correction signal 102" is supplied to a control system 50". Depending upon the required error correction, the control system 50" may generate or modify one or more of the control logic signals 52", 54", 56", 58" for selectively activating and adjusting the various components of the respective TAP devices 42", 44", 46", 48". The estimated error correction signal 102" may further be modified by external input and commands 104", which may be provided electronically or manually as desired. The control system 50" may command adjustment to none, one or more of the TAP devices 42", 44", 46", 48", as desired. Because the second output signals 162, 164, 166, 168 are not sampled but instead are directly provided by the respective TAP devices 42", 44", 46", 48", any errors introduced by the RF couplers 82, 84, 86, 88 are eliminated from the embodiment described hereinabove, creating a more robust control and calibration system.

Figure 4:
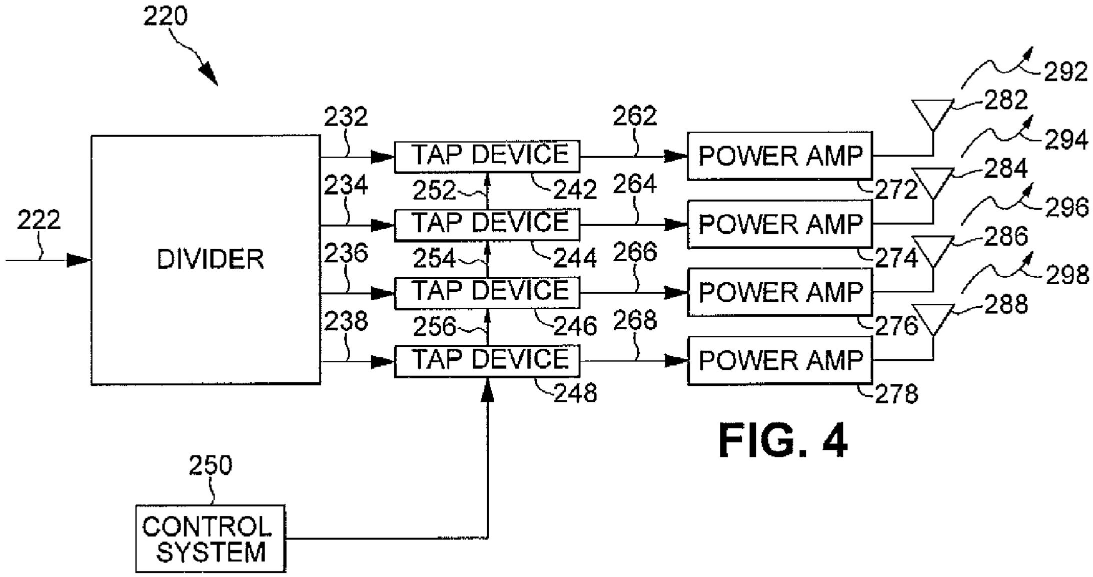
FIG. 4 is a simplified block diagram for an adaptive variable true time delay beamforming method adapted to transmit a signal by generating multiple outputs according to one embodiment of the invention.

The beamforming system of the present invention is easily configured to transmit an electronically scanned beam, as illustrated in FIG. 4. In the beamforming system 220, a coherent signal 222 is fed to a signal divider 224, which divides the coherent signal 222 into a plurality of input signals 232, 234, 236, 238. It is understood that the number of input signals may be any number as desired and required for a given application. Each of the input signals 232, 234, 236, 238 is received by a respective TAP device 242, 244, 246, 248. The TAP devices 242, 244, 246, 248 each provide selective, independent, and variable control over a time delay, an amplitude, and a phase of a radio frequency signal, and is implemented as a packaged RFIC. Additionally, to accomplish selective, independent and variable control over a time delay, an amplitude and a phase of a radio frequency signal, each of the TAP devices 242, 244, 246, 248 is adapted to receive a respective control logic signal 252, 254, 256, 258. The control logic signals 252, 254, 256, 258 provide each respective TAP device 242, 244, 246, 248 with logic for independently and selectively activating and adjusting the various components of the TAP devices 242, 244, 246, 248. The control logic signals 252, 254, 256, 258 may also be used for any of a variety of other suitable functions for the respective TAP devices 242, 244, 246, 248. It is understood that the control logic signals 252, 254, 256, 258 may be implemented by and include any number of hardware and software components to route and process signals and control the functionality of the TAP devices 242, 244, 246, 248, including by a control system 250 or by components and software internal to each of the TAP devices 242, 244, 246, 248.

The TAP devices 242, 244, 246, 248 provide an independently controllable and programmable time delay, an amplitude and a phase control over the respective signals 232, 234, 236, 238 to account for any diversity in the beamforming system 220, and to generate respective output signals 262, 264, 266, 268. The output signals 262, 264, 266, 268 are communicated as necessary through respective power amplifiers 272, 274, 276, 278 and are emitted through respective antennas 282, 284, 286, 288 as respective transmission signals 292, 294, 296, 298.

Similar to the signal reception beamforming systems of FIGS. 1-3, the beamforming system 220 utilizes RFIC components to minimize an overall package size and provide lower power consumption, lower cost, and simplicity of use. The TAP devices 242, 244, 246, 268 may be combined with the control system 250 and the signal divider 224 onto a single multi-layer printed circuit board. If desired, the power amplifiers 272, 274, 276, 278 may be combined onto the same multi-layer printed circuit board, or they may be located independently proximate the antennas 282, 284, 286, 288, further reducing the package size of the beamforming system 220.

Moreover, each multi-layer printed circuit board may be easily and repeatedly reproduced. The multi-layer printed circuit beamforming system 220 does not include any moving parts, and does not include any parts that require physical manipulation in the field for maintenance or for calibration. As a result, the transmission beamforming system 220 may not require periodic maintenance in the field, and may not require calibration beyond an initial factory calibration. However, the beamforming system 220 may further include a calibration system that accomplishes system verification, calibration and correction electronically without requiring any physical manipulation of the beamforming system 220.

Figure 5:
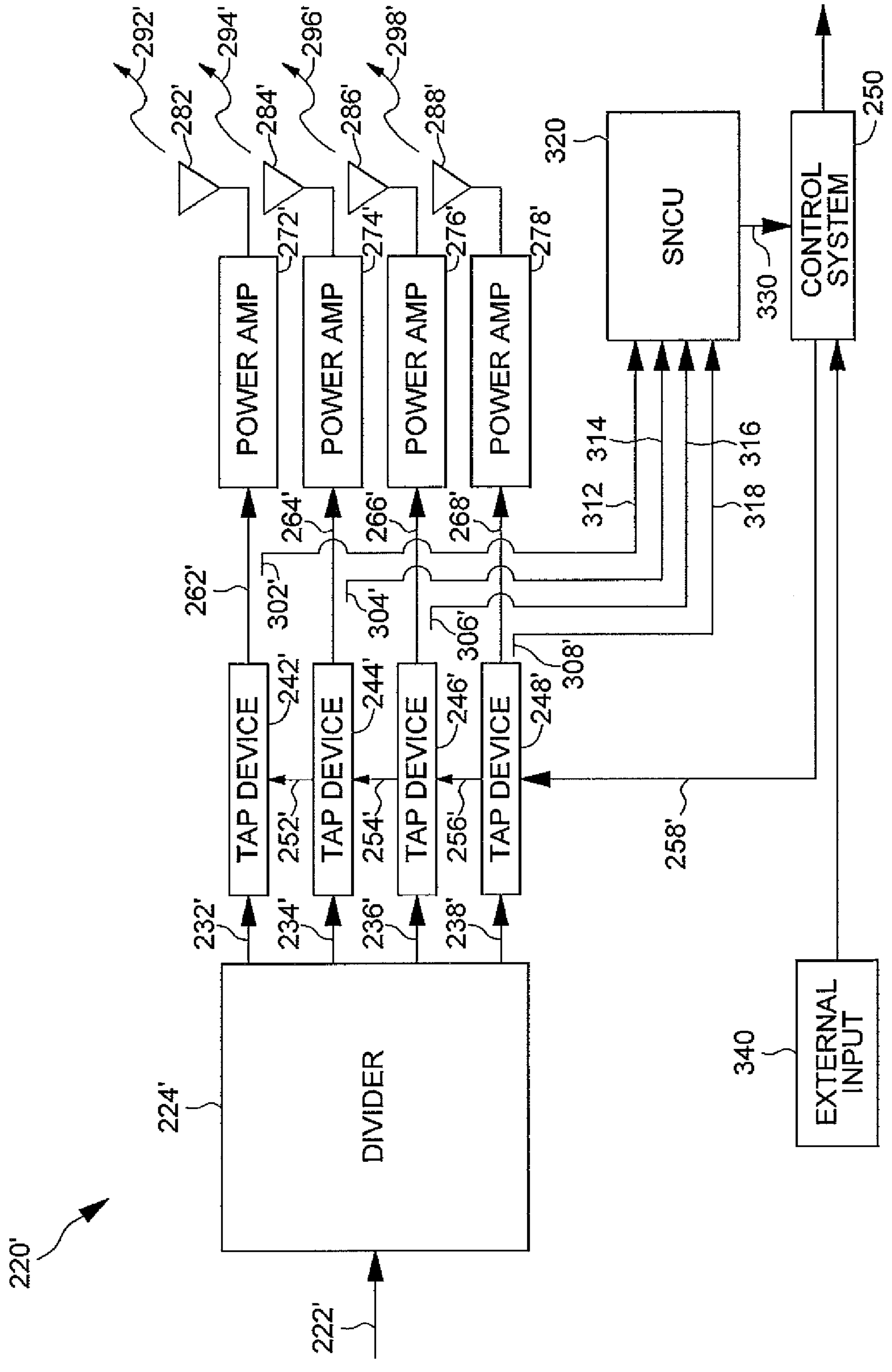
FIG. 5 is a simplified block diagram for an adaptive variable true time delay beamforming method adapted to transmit a signal and generate multiple outputs, further including automatic calibration according to another embodiment of the invention.

Another embodiment of a transmission beamforming system 220' for transmitting a coherent signal 222' is illustrated in FIG. 5. Structure repeated from the description of FIG. 4 includes the same reference numeral and a prime (') symbol. Additionally, the beamforming system 220' includes a system to provide automatic calibration and correction information to the TAP devices 242', 244', 246', 248', where each of the TAP devices 242', 244', 246', 248' respectively provides a single output signal 262', 264', 266', 268' to the respective power amplifiers 272', 274', 276', 278'. The automatic calibration system utilizes RF couplers 302, 304, 306, 308 to respectively sample the output signals 262', 264', 266', 268' generated by the respective TAP devices 242', 244', 246', 248'. The sampled signals 312, 314, 316, 318 are received by a channel signal and noise characterization unit 320 that measures and characterizes the sampled signals 312, 314, 316, 318. Any discrepancy, including phase, amplitude or time error, is detected by the channel signal and noise characterization unit 320, and an estimated error correction signal 330 is supplied to a control system 250'. Depending upon the required error correction, the control system 250' may generate or modify one or more of the control logic signals 252', 254', 256', 258' for selectively activating and adjusting the various components of the respective TAP devices 242', 244', 246', 248'. The estimated error correction signal 330 may further be modified by external input and commands 340, which may be provided electronically or manually as desired. The control system 250'may command adjustment to none, one or more of the TAP devices 242', 244', 246', 248', as needed and desired.

Figure 6:
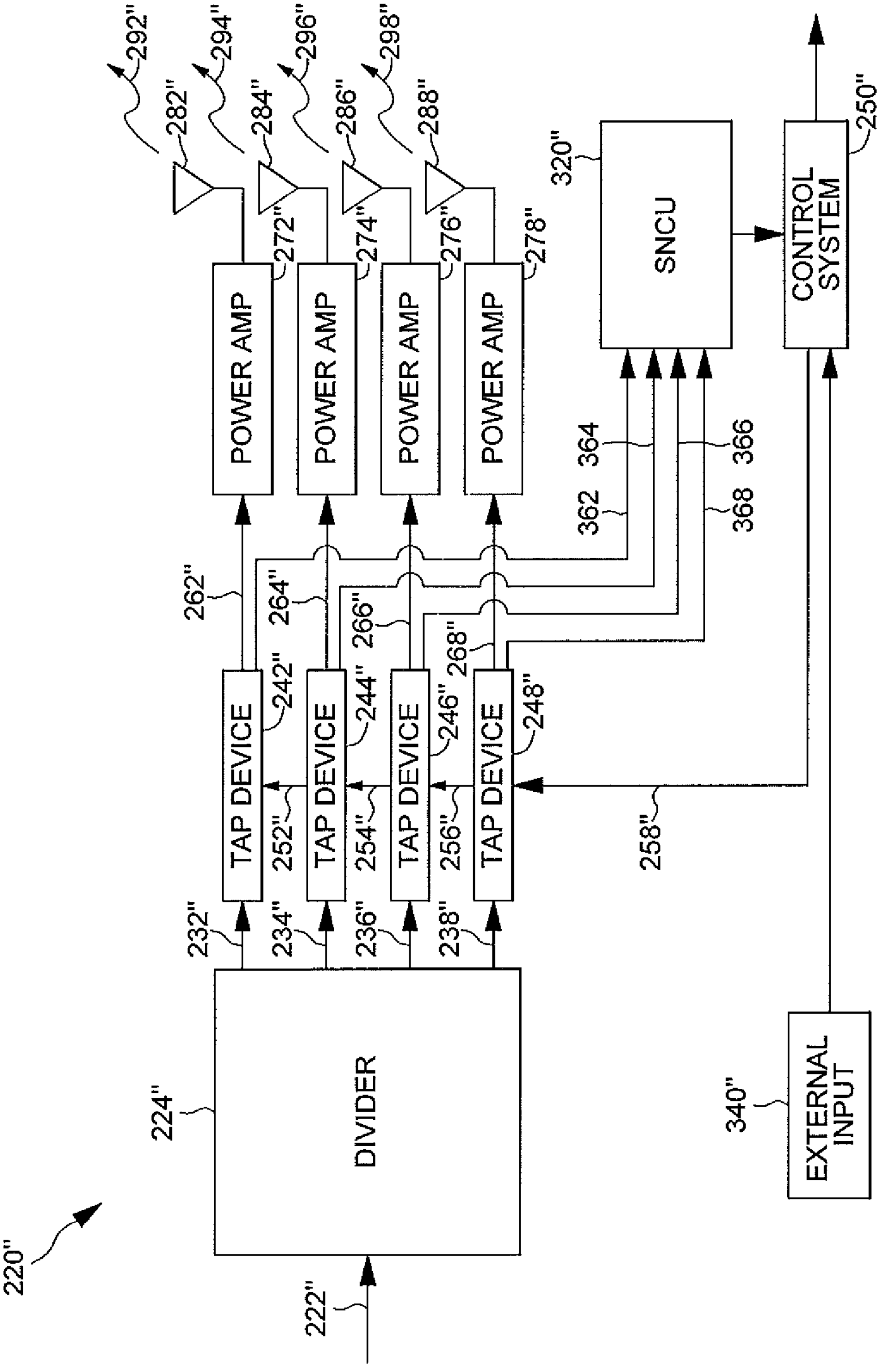
FIG. 6 is a simplified block diagram for an adaptive variable true time delay beamforming method adapted to transmit a signal and generate multiple outputs wherein some outputs are utilized for automatic calibration according to another embodiment of the invention.

A further embodiment of a transmission beamforming system 220" for transmitting a coherent signal 222" is illustrated in FIG. 6. Structure repeated from the description of FIG. 4 or FIG. 5 includes the same reference numeral and a double prime (") symbol. The beamforming system 220" includes a system to provide automatic calibration and correction information to the TAP devices 242", 244", 246", 248", where each of the TAP devices 242", 244", 246", 248" respectively provides at least a second output signal 362, 364, 366, 368. The second output signals 362, 364, 366, 368 may be control signals representative of the output signals 262", 264", 266", 268". More typically, the second output signals 362, 364, 366, 368 are identical to the output signals 262", 264", 266", 268". The second output signals 362, 364, 366, 368 are received by a channel signal and noise characterization unit 320" that directly measures and characterizes the second output signals 362, 364, 366, 368. Any discrepancy, including phase, amplitude or time error, is detected by the channel signal and noise characterization unit 320", and an estimated error correction signal 330" is supplied to a control system 250". Depending upon the required error correction, the control system 250" may generate or modify one or more of the control logic signals 252", 254", 256", 258" for selectively activating and adjusting the various components of the respective TAP devices 242", 244", 246", 248". The estimated error correction signal 330" may further be modified by external input and commands 340", which may be provided electronically or manually as desired. The control system 250" may command adjustment to none, one or more of the TAP devices 242", 244", 246", 248", as desired. Because the second output signals 362, 364, 366, 168 are not sampled but instead are directly provided by the respective TAP devices 242", 244", 246", 248", any errors introduced by the RF couplers 302, 304, 306, 308 are eliminated, creating a more robust control and calibration system.

Figure 7:
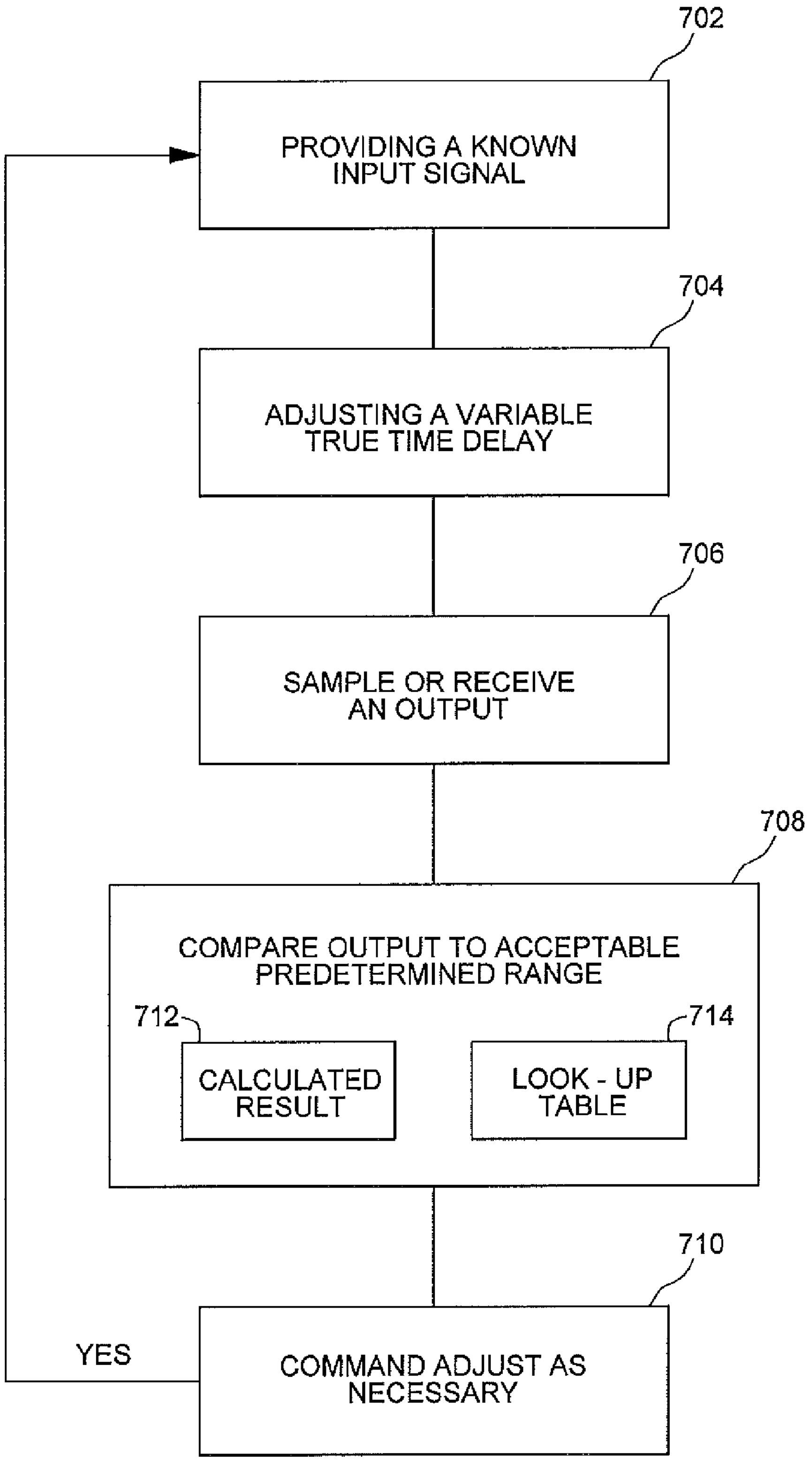
FIG. 7 is a simplified block diagram for a method of automatically calibrating an adaptive variable true time delay beam forming system according to another embodiment of the invention.

An exemplary automatic calibration method is illustrated in FIG. 7, and will be described with reference to the transmission system of FIG. 6. It is understood, however, that the automatic calibration system of FIG. 7 is applicable to all disclosed embodiments. Calibration is initiated by providing or receiving a known reference signal at step 702. The reference signal may be provided as input signal 222", which may then be split by the signal divider 224", or the reference signal may be included as part of the control logic signals 252", 254", 256", 258", and may further be modified by external input 340" as desired. At step 704, the input signal is adjusted. In particular, the input signal is received by one or more of the TAP devices 242", 244", 246", 248", wherein at least one of a time delay, a phase change or an amplitude change is made to the signal, creating at least one of the output signals 362, 364, 366, 368. The at least one of the output signals 362, 364, 366, 368 is evaluated by, sampled by or received by the channel signal and noise characterization unit 320" at step 706. The channel signal and noise characterization unit 320" compares the at least one of the output signals 362, 364, 366, 368 at step 708 to known or calculated values to generate the error correction signal 330 for evaluation by the control system 250". If the error correction signal 330 is within an acceptable predetermined range, then no calibration is necessary. But if the error correction signal 330 falls outside of the acceptable predetermined range, then the control system 250" commands selective adjustments at step 710 to one or more of the TAP devices 242", 244", 246", 248" through the control logic signals 252", 254", 256", 258" as necessary. The calibration method may repeat as required to achieve acceptable calibration results.

In one embodiment, the step 708 of comparing the at least one of the output signals 362, 364, 366, 368 includes the additional step of comparing the relevant parameters of the at least one of the output signals 362, 364, 366, 368, such as time delay, phase and amplitude, to calculated values 712. In another embodiment, step 708 includes the additional step of comparing the relevant parameters of the at least one of the output signals 362, 364, 366, 368 to values in a look-up table 714 integral with the control system 250".

Because the receive and transmission true time delay systems, including any automatic calibration systems, may be mounted on a single multi-layer printed circuit board, the automatic calibration methods may be selectively implemented. By way of example, the automatic calibration method may be implemented after regular periods, or the automatic calibration may be commanded by the external input at any time, or the automatic calibration may be implemented in response to a received error correction signal 330.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A true time delay beamforming system, comprising:

at least one signal conditioning device receiving at least one input signal, wherein the signal conditioning device is adapted to provide selective, independent, and variable control of one of a phase, a time delay and an amplitude of the input signal to produce an output signal:

a control system adapted to provide a control logic signal to the at least one signal conditioning device for selectively activating and controlling the signal conditioning device; and a calibration system for detecting and correcting error in at least one of a phase, a time delay and an amplitude of the output signal, wherein the calibration system comprises a channel signal and noise characterization unit adapted to receive the output signal and to detect phase, amplitude, and time errors to generate an estimated error correction signal therefrom, the error correction signal received by the control system for selectively generating the control logic signal.

2. The true time delay beamforming system of claim 1, wherein the control system further receives an external input, the external input being utilized in combination with the estimated error correction signal by the control system to generate the control logic signal.

3. The true time delay beamforming system of claim 1, wherein a sampling system adapted to sample the output signal provides the output signal to the channel signal and noise characterization unit.

4. The true time delay beamforming system of claim 1, wherein the signal conditioning device produces a plurality of output signals, at least one of which is received by the channel signal and noise characterization unit.

5. The true time delay beamforming system of claim 4, further comprising an antenna in signal communication with the at least one signal conditioning device, the at least one input signal received from the antenna.

6. The true time delay beamforming system of claim 4, further comprising an antenna in signal communication with the at least one signal conditioning device to receive and radiate the output signal.

7. The true time delay beamforming system of claim 1, wherein the at least one input signal is received by the signal conditioning device as a portion of the control logic signal.

8. A true time delay beamforming network, comprising:

a plurality of signal conditioning devices, wherein each of the signal conditioning devices receives an input signal and conditions the input signal by independently and selectively adjusting at least one of a time delay, a phase, and an amplitude of the input signal to produce an output signal;

a control system adapted to provide a control logic signal to the at least one signal conditioning device for selectively activating and controlling the signal conditioning device; and a channel signal and noise characterization unit adapted to detect phase, amplitude, and time errors in the output signal to generate an estimated error correction signal therefrom, the error correction signal received by the control system for selectively generating the control logic signal.

9. The true time delay beamforming system of claim 8, wherein a sampling system adapted to sample the output signal provides a signal representative of the output signal to the channel signal and noise characterization unit, the sampled signal utilized to generate the error correction signal.

10. The true time delay beamforming system of claim 8, wherein each of the plurality of signal conditioning device devices produces a plurality of output signals, at least one of which is received by the channel signal and noise characterization unit and is utilized to generate the error correction signal.

11. The true time delay beamforming system of claim 8, further comprising at least one antenna in signal communication with the plurality of signal conditioning devices, each input signal received from the at least one antenna.

12. The true time delay beamforming system of claim 8, further comprising an antenna in signal communication with the at least one of the plurality of signal conditioning devices to receive and radiate the output signal.

13. The true time delay beamforming system of claim 8, wherein the input signal is received by the plurality of signal conditioning devices as a portion of the control logic signal.

14. A method for calibrating a true time delay beamforming system, comprising:

receiving a reference signal;

adjusting at least one of a time delay, a phase, and an amplitude of the reference signal in a signal conditioning device to create an output signal;

receiving a calibration signal representative of the output signal in a channel signal and noise characterization unit;

comparing the calibration signal for errors in at least one of a time delay, a phase and an amplitude to predetermined values to generate an error correction signal therefrom; and selectively generating a control logic signal based on the error correction signal, the control logic signal transmitted to the signal conditioning device to modify the adjusting step.

15. The method for calibrating a true time delay beamforming system of claim 14, wherein the reference signal is received from a control system.

16. The method for calibrating a true time delay beamforming system of claim 15, wherein the comparing step includes comparing the time delay, the phase, and the amplitude to known values.

17. The method for calibrating a true time delay beamforming system of claim 15, wherein the comparing step includes comparing the time delay, the phase, and the amplitude to values in a look-up table.

* * * * *